July 29, 1924.

J. W. COOK ET AL 1,502,713

KNOT TYING APPARATUS

Filed Sept. 18, 1919

Inventors:
John W. Cook
Thomas Collins

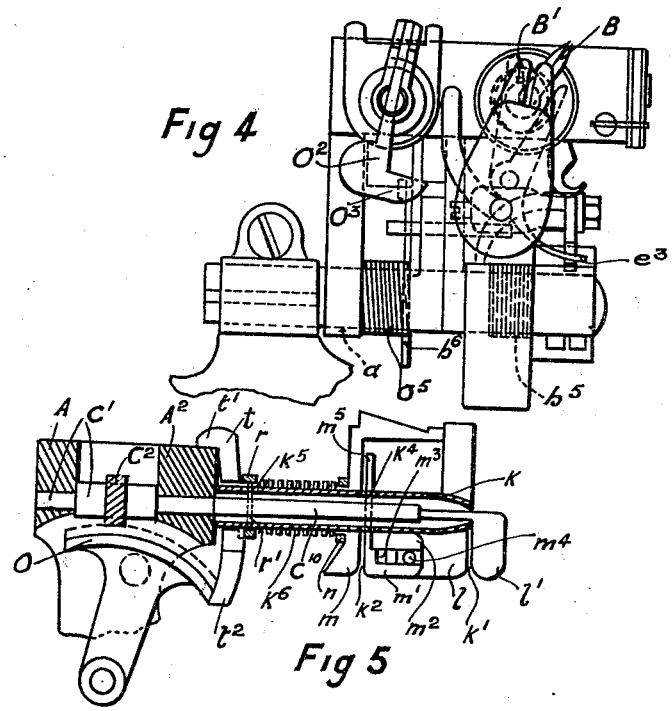
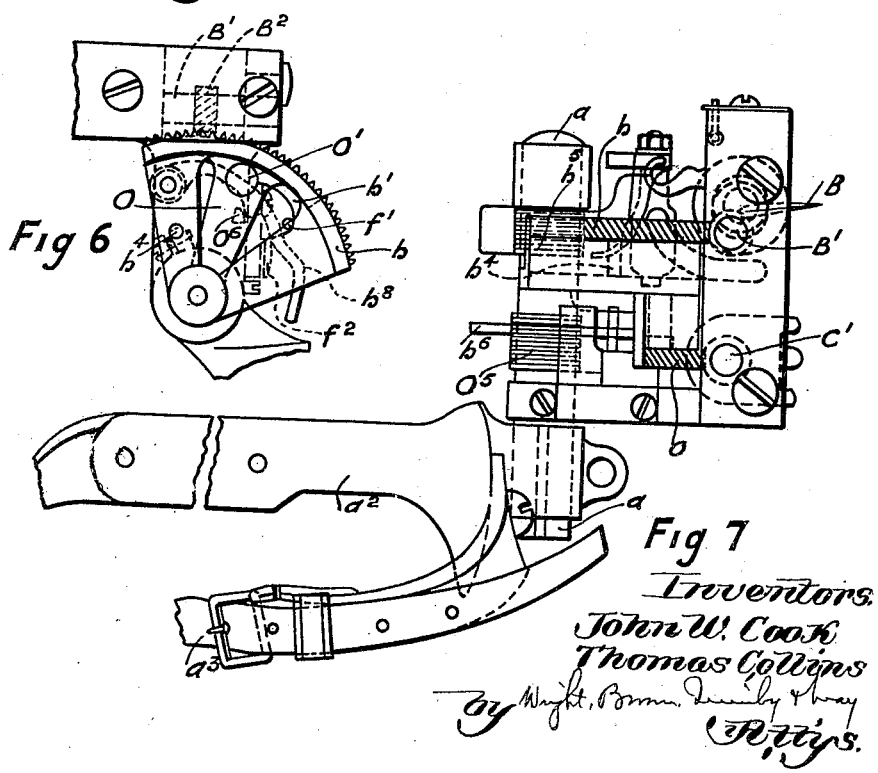

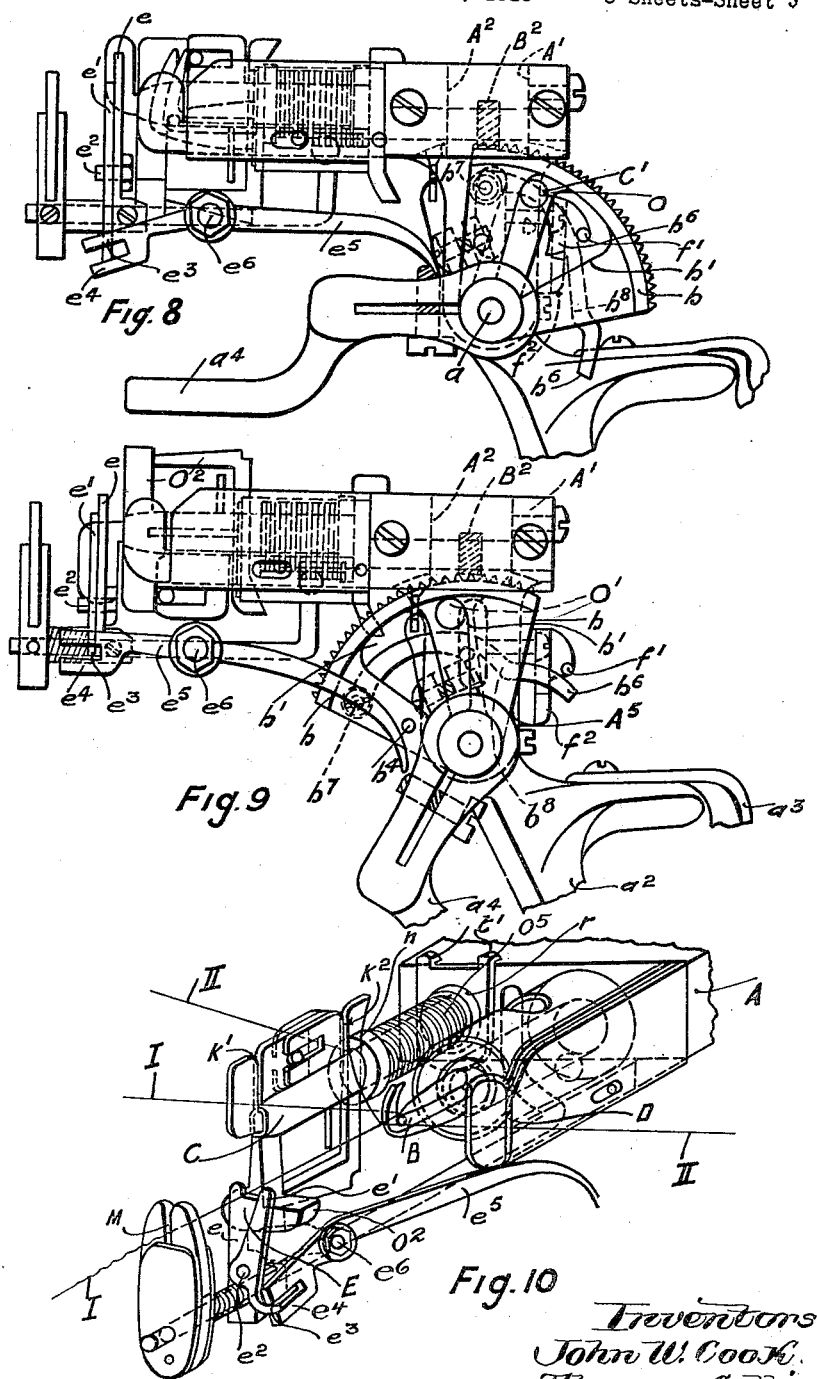

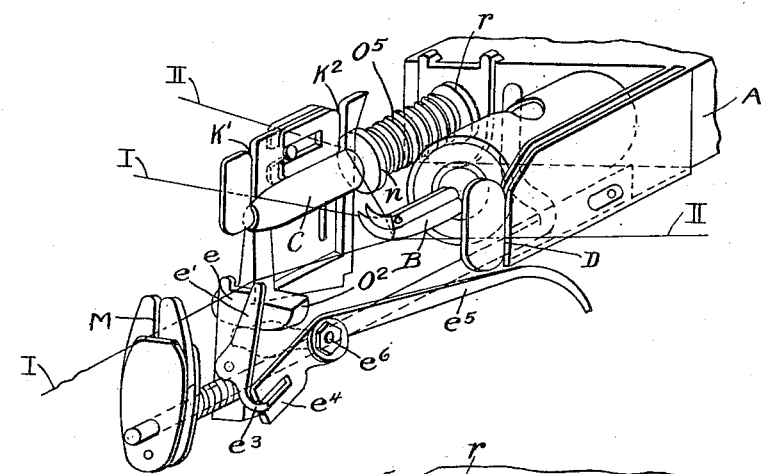
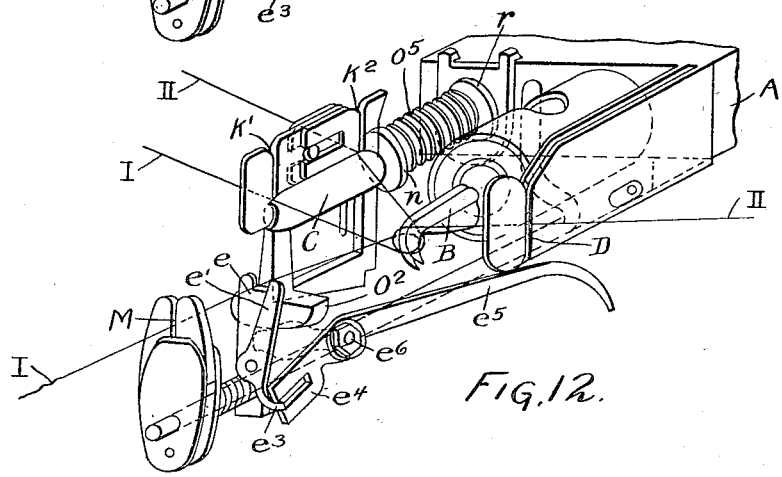

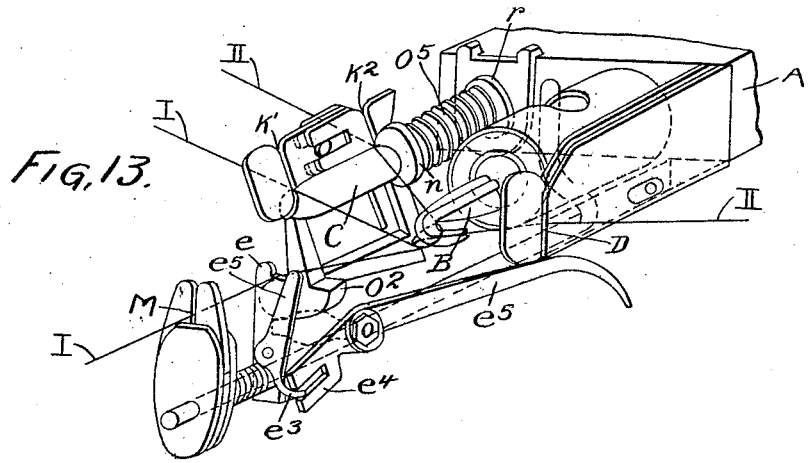
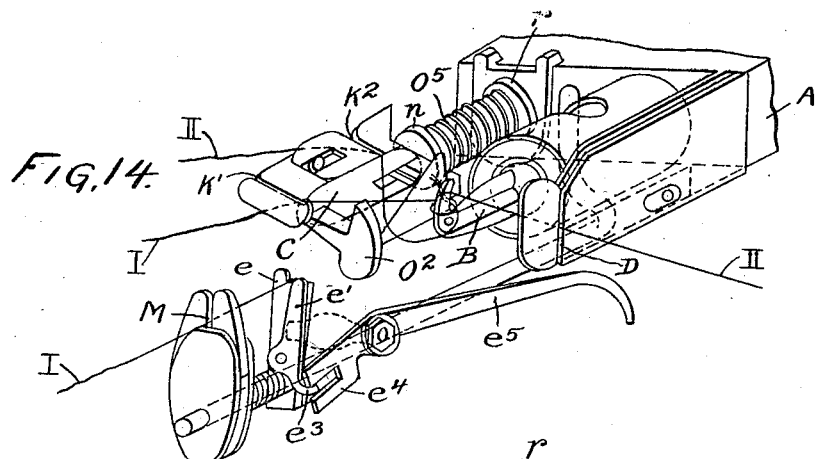
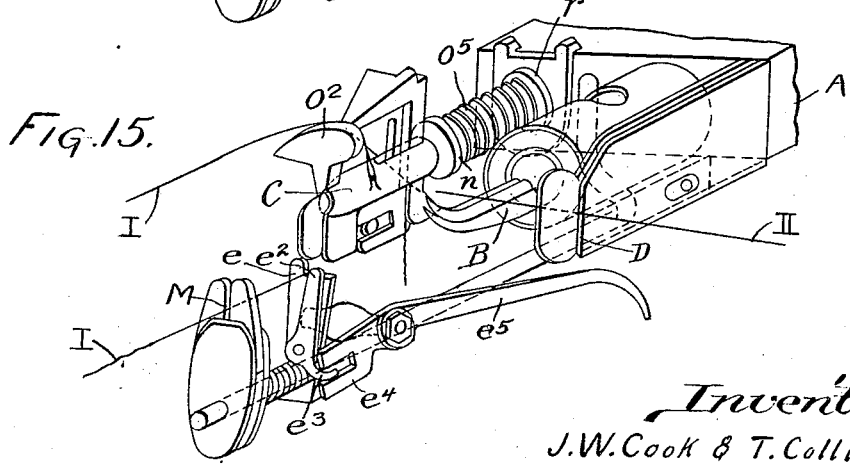

Patented July 29, 1924.

1,502,713

UNITED STATES PATENT OFFICE.

JOHN WILLIAM COOK, OF MANCHESTER, AND THOMAS COLLINS, OF HALE, NEAR MANCHESTER, ENGLAND, ASSIGNORS TO COOK & CO. MANCHESTER LIMITED, OF MANCHESTER, ENGLAND, A COMPANY ORGANIZED UNDER THE LAWS OF THE UNITED KINGDOM OF GREAT BRITAIN.

KNOT-TYING APPARATUS.

Application filed September 18, 1919. Serial No. 324,541.

*To all whom it may concern:*

Be it known that we, JOHN WILLIAM COOK, residing at Manchester, England, and THOMAS COLLINS, residing at Hale, near Manchester, aforesaid, both subjects of the King of Great Britain and Ireland, have invented certain new and useful Improvements in Knot-Tying Apparatus, of which the following is a specification.

This invention relates to apparatus for tying what are known as weavers' knots and it relates particularly to weavers' knotters of the kind in which the apparatus is carried on one hand and is operated by a digit of that hand.

The chief object of the present invention is to provide an improved mechanical weavers' knotter of the above stated kind in which the laying of the threads to be tied together and the operation of the apparatus to tie the knot are both of a simple character.

The improved weavers' knotter is so constructed that after the threads have been laid across the apparatus in the correct positions a single continuous forward movement of an operating lever will effect the tying of the knot; a rotary knotting bill is employed and the threads to be knotted together are laid along opposite sides of the points of the knotting bill and are crossed so as to intersect each other adjacent to the knotting bill before and after passing the same. A rotary drawing-off member may be employed and the said member may be adapted to engage with both threads for the purpose of retaining them in position for knotting; the knotting bill will cut off the end of one thread, which may be gripped by a stationary clip, and the end of the other or second thread may be cut off by an independent cutter, prior to which, the end of the said thread may be held in a second spring clip adjacent to the said cutter. The rotary drawing-off member may be provided with an inclined blade which, during the tying process, is adapted to slide one of the threads in a lateral direction approximately into alignment with the knotting bill, thus facilitating the tying of the knot.

These and other features will now be described with reference to the embodiment of our invention shown in the accompanying drawing, in which Figure 1 is a side elevation showing the parts in the positions they assume normally, that is to say, when the apparatus is not in use; and Figure 2 is a plan of the same.

Figure 4 is an end view of the apparatus as shown in Figures 1 and 2.

Figure 5 is a longitudinal section showing the construction of the drawing-off member in detail.

Figure 6 is a side elevation of mechanism employed for actuating the knotting bill and drawing-off member, this view being of the opposite side of the apparatus to that shown in Figure 1.

Figure 7 is a view of the opposite end of the apparatus to that shown in Figure 4.

Figures 8 and 9 are elevations of the apparatus showing the side opposite to that shown in Figure 1, Figure 8 showing the parts in the position they assume normally that is to say, when the apparatus is not in use, and Figure 9 showing them in the positions they have been moved into at the completion of the process of tying a knot.

Figure 10 is a perspective view showing the members that co-operate with or act upon the threads prior to and while the knot is being tied.

Figures 11 to 15 show the successive positions assumed by the bill B and the drawing-off member C during the formation of the knot.

Figure 11 shows the parts after the knotting bill has been turned through about 45° in a counter-clockwise direction, the drawing-off member remaining stationary during such movement.

Figure 12 shows the parts after the knotting bill has been turned through about 180° from its initial position (Figure 10), the other parts still remaining stationary.

Figure 13 shows the knotting bill turned through about 270° and the drawing-off member turned through about 40°.

Figure 14 shows the knotting bill after it is turned through about 360° and the drawing-off member turned through about 90°; the thread I has been severed by the cutter and the thread II has been severed by the bill, and the ends of both threads are about to be retained by the points of the bill and thus drawn through the loop formed by the two threads wound around the hook of the bill.

Figure 15 shows the two clips open and the threads released.

Like letters refer to like parts throughout the drawings.

Figure 1:
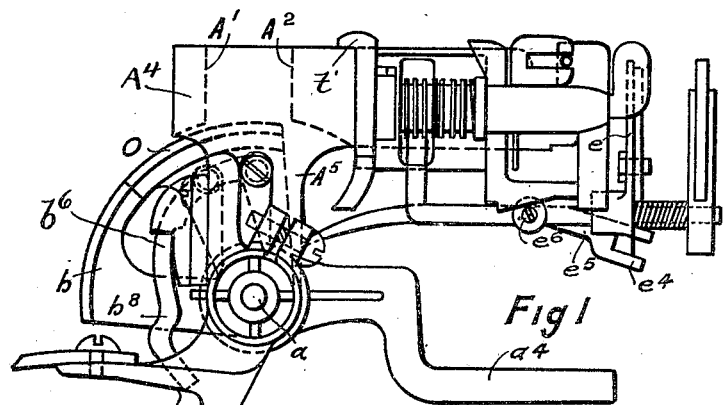
Figure 2:
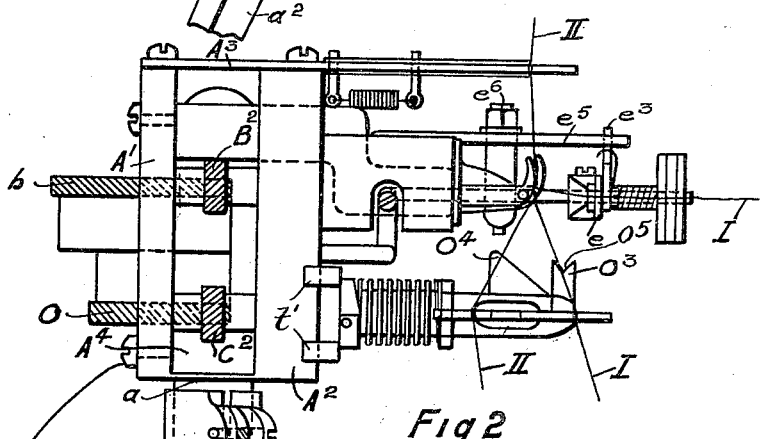

Referring first more particularly to Figure 10, A is the frame of the apparatus; B is a rotary knotting bill; C is a rotary drawing off member provided with two clips $k^1$ $k^2$, one for each of the two threads, I and II, to be knotted together; and M, D are two stationary clips each adapted to receive and hold one of the two thread ends during the process of tying the knot and until the said ends are cut off. E is a cutter for severing the end of one thread after the knot has been tied; the other or second thread is cut off by the knotting bill B in a manner similar to that in which rotary bills are employed to cut off the ends of both of the two threads in some forms of mechanical knotters adapted to tie other than weavers' knots.

Figure 10 shows the knotting-members in the positions they assume normally, and the two lines I and II indicate the positions of the two threads after they have been laid across the apparatus in position for knotting; the thread I has been pressed into the clip $k^1$ of the rotary drawing-off member, passed around the inner side of the hook of the knotting bill, between the members of the cutter E, and pressed into the stationary clip M; the thread II has been pressed into the clip $k^2$ of the member C, passed across the thread I, around the outer side of the hook portion of the knotting bill, again across the thread I and into the stationary clip D. By the operation of an arm the knotting bill B, the rotary drawing-off member C and the cutter E will all receive their correct movements as will now be more particularly described so that the threads will be held together by a weaver's knot, the ends cut off, and the two threads released automatically from the clips $k^1$, $k^2$ of the drawing-off member.

The frame of the apparatus comprises two parallel members $A^1$ $A^2$, and end members $A^3$ $A^4$; the member $A^4$ is formed with a lug $A^5$ that carries a shaft $a$, which is firmly secured to the lug $A^5$ and projects on both sides thereof; on one side a handle $a^2$ is securely fixed and is provided with a strap $a^3$ adapted to pass around the hand of the user, as is well understood; whilst on the other side of the said lug the shaft $a$ has pivoted upon it an operating arm $a^4$—adapted to be pressed downward by the thumb of the hand that grips the handle $a^2$—and two quadrants $b$ and O from which movement is transmitted to the knotting bill B and the rotary drawing-off member C respectively. The knotting bill B and the drawing-off member C are respectively carried by spindles $B^1$ and $C^1$ mounted in bearings in the parallel members $A^1$ $A^2$ of the frame, and the spindles $B^1$ $C^1$ are respectively provided with helical pinions $B^2$ $C^2$ that gear with corresponding teeth on the curved peripheries of the quadrants $b$ and O.

The quadrant $b$ is secured to and is therefore movable with the operating arm $a^4$; the quadrant O is, however, mounted loosely upon the shaft $a$, but is operatively connected to the quadrant $b$ by a lateral pin $O^1$, which extends into an opening $b^1$ formed in the quadrant $b$. Thus the quadrant $b$ has to be rocked through a considerable portion of its amplitude of movement before the end of the opening $b^1$ comes against the pin $O^1$ when the quadrant O is carried forward by the quadrant $b$ through the rest of the forward movement of the latter, that is to say, until the parts assume the positions shown in Figure 9.

Figure 3:
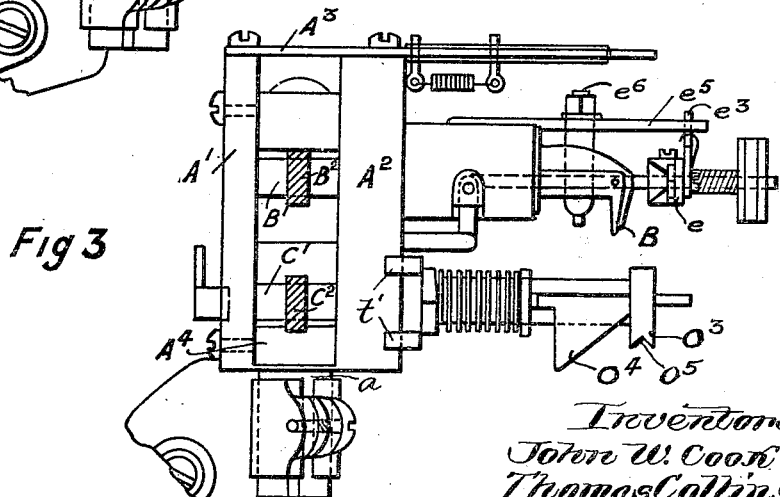
Figure 3 is a plan showing the positions of the parts at the completion of the tying of the knot.

The respective movements of the rotary knotting bill B and of the rotary drawing-off member C correspond with the movements of their operating quadrants $b$ and O: the knotting bill B moves through the greater portion of its path before the drawing-off member C begins to move. The member C, as has already been stated, has two clips $k^1$ and $k^2$ each adapted to engage with one of the two threads I and II, to be tied together; and diametrically opposite these clips there is provided a projection $O^2$, the outer portion of which is adapted to engage with the threads to be tied together, and since, during the rotation of the drawing-off member, the said outer portion passes through a comparatively long path, the knot is quickly tightened and drawn off while the spindle $C^1$ is turning through only a portion of a revolution. The said outer portion of the projection $O^2$ is provided with guide members $O^3$, $O^4$ for the threads: the guide $O^3$ engages with the thread I by means of its groove or notch $O^5$ and holds it in position; and the guide $O^4$ engages with the thread II, and, as the knot is being tied, slides the said thread laterally into approximate alignment with the point of the knotting bill B when the latter is in the position it assumes just at the completion of the process of tying the knot (Figures 3 and 9).

The cutter E consists of a stationary member $e$ provided with a cutting edge and cooperating with the sharpened edge of a rocking member $e^1$ pivoted at $e^2$ and formed with a downward projection $e^3$ which is engaged by a forked end $e^4$ of a lever $e^5$ which is pivoted at $e^6$ and has its lower end lying in the path of a pin $b^4$ on the quadrant $b$ so that when, in its forward movement, the quadrant has reached a predetermined position the pin $b^4$ comes into contact with the lower end of the lever $e^5$ which, in turn, rocks the member $e^1$ of the cutter E and cuts off the end of the thread I.

The quadrant $b$ is returned to its initial position by means of a helical spring $b^5$ wound around its boss and having one end in engagement with the said quadrant and the other secured to the frame A; the quadrant O is also constantly acted upon by a spring, $O^5$, that tends to return it to its initial position.

In addition to the pin $O^1$ and opening $b^1$, the two quadrants $b$ and O are provided with further means whereby they may be positively locked together: such positive means comprise a pawl $b^6$ pivoted at $b^7$ upon the quadrant $b$ and adapted to be brought into engagement with a pin $O^6$ on the quadrant O as soon as the pin $O^1$ comes into contact with the end of the opening $b^1$ in the quadrant $b$; the pawl $b^6$ is provided with an extension or tail $b^8$ which is curved as shown (Figures 1, 6, 8, and 9) and passes between upper and lower members $f^1$ $f^2$ mounted upon the lug $A^5$ of the frame A. As the quadrant $b$, on which the pawl $b^6$ is pivoted, oscillates to and fro the curved tail $b^8$ in passing between the members $f^1$ $f^2$ acts as a cam and causes the pawl $b^6$ to be lowered into engagement with the pin $O^6$ during the forward movement of the quadrant $b$ and raised out of engagement with the said pin at the end of the backward movement of the said quadrant; the quadrants $b$ and O are therefore locked together by the pin $O^6$ and pawl $b^6$, and the pin $O^1$ and the end of the opening $b^1$ during their common movement in each direction. After the quadrant O has come to rest at the end of its backward movement and the pawl $b^6$ has been raised, by the tail $b^8$, clear of the pin $O^6$, the quadrant $b$ continues to move backwards under the influence of its spring $b^5$ until the free end of the pawl $b^6$ comes into engagement with the member $f^2$ which thus acts as a stop for the quadrant.

Referring now more particularly to Figure 5, which is a longitudinal section of the drawing-off member C this figure shows the construction of the clips $k^1$ $k^2$ whereby the threads are gripped firmly during the process of tying and drawing-off, but are released as soon as these operations have been completed. The spindle $k$ of the drawing-off member C is hollow and within the bore of the said spindle is a rod $c^{10}$ which is adapted to slide longitudinally. The clips $k^1$ $k^2$ each comprise a stationary jaw $l$, $m$ and a movable jaw $l^1$, $m^1$; the stationary jaws $l$, $m$ are formed or provided on the hollow spindle $k$, whilst the movable jaws $l^1$, $m^1$ are mounted upon the rod $c^{10}$, the jaw $m^1$ projecting through a longitudinal slot $k^4$ in spindle $k$, whilst the jaw $l^1$ is formed upon the end of the rod $c^{10}$ and is situated beyond the end of the hollow spindle $k$. The jaw $m^1$ is formed with guiding members $m^2$ each having a slot $m^3$ with which the ends of a pin $m^4$, in the jaw $l$ engage. The hollow spindle $k$ is provided with a fixed collar $n$ and a collar $r$ adapted to slide longitudinally upon the spindle $k$ and connected to the rod $c^{10}$ by means of a pin $r^1$ passing through a longitudinal slot $k^5$ in the spindle $k$. A spring $k^6$ is arranged on the spindle $k$ between the collars $n$ and $r$. An actuating member $t$ is mounted loosely upon the hollow spindle $k$; it lies closely against the sliding collar $r$ and is provided with two backward projections $t^1$ adapted to engage with the cross member $A^2$ of the frame A in order to prevent its rotating with the spindle $k$; and it is also provided with a downward projection $t^2$ extending into the path of the quadrant O which, at the extreme end of its forward movement, comes into contact with the said projection $t^2$ and causes it to move axially of the spindle $k$ carrying with it the collar $r$, the rod $c^{10}$, and the movable jaws $l^1$ $m^1$: the clips $k^1$ $k^2$ are thus automatically opened immediately after the knot has been tightened by the drawing-off member C, and the two threads, now knotted together, are released.

We claim as our invention:—

1. In a weaver's knotter, the combination of a rotary knotting bill, a rotary drawing-off member, separate clips upon the drawing-off member for the threads to be knotted together, and stationary clips also adapted to engage with the threads to be knotted together, the said clips being so arranged relatively to the knotting bill as to enable the threads to be knotted together to be laid on opposite sides of the points of the bill in such a way as to cross or intersect each other on each side of the bill and adjacent thereto.

2. In a weaver's knotter, the combination of a rotary knotting bill, a rotary drawing-off member, separate clips on the drawing-off member for the threads to be knotted together, and separate stationary clips for the said threads, the said bill being so arranged as to engage with the threads when the latter are laid in their proper position relatively to the said operative members.

3. In a weaver's knotter, the combination of a rotary knotting bill for cutting off the end of one of two threads to be knotted together, a rotary drawing-off member engaging with the two threads, a cutter for operating on the other of the two threads, and retaining means for holding the ends of the threads while the knot is being tied.

4. In a weaver's knotter, the combination of a rotary knotting-bill, a rotary drawing-off member, means situated on the drawing-off member for engaging with each of the threads separately during the process of tying the knot, and retaining means adapted to hold the ends of the said threads while the knot is being tied.

5. In a weaver's knotter, the combination of a rotary knotting bill; retaining means adapted to hold the ends of the threads while the knot is being tied; and a rotary drawing-off member comprising a hollow rotary member, stationary jaws on the said member, a movable rod situated within the said member, jaws upon the said rod adapted to co-operate with the stationary jaws to form thread clips, resilient means tending to keep the said clips closed, and means adapted to open the said clips to release the threads when the knot has been tied.

6. In a weaver's knotter, the combination of a rotary knotting-bill; retaining means adapted to hold the ends of the threads while the knot is being tied; and a rotary drawing-off member provided with clips adapted to engage with each of the threads separately during the tying of the knot and with means for guiding the said threads into the correct position relatively to the knotting bill during the said tying process.

7. In a weaver's knotter, the combination of a rotary knotting-bill adapted to cut off the end of one of the threads, a rotary drawing-off member adapted to engage with the two threads, retaining means for holding the ends of the threads while the knot is being tied, and a cutting device adapted to cut off the end of the second thread when the knot has been tied.

8. In a weaver's knotter, the combination with a rotary knotting bill and a rotary drawing-off member and mechanism for actuating the same, of means for positively connecting the two mechanisms at the desired point in the forward movement of the parts and for disconnecting the same at the desired point in the backward movement of the same.

9. In a weaver's knotter, the combination with a rotary knotting-bill and a rotary drawing-off member, of spindles carrying the said bill and drawing-off member respectively, a helical pinion on each of the said spindles, quadrants each having helical teeth adapted to gear with and to transmit rotary motion to the spindles, and means adapted to lock the said quadrants positively together during a portion of the motion of the bill-operating quadrant.

10. In a weaver's knotter, the combination with a rotary knotting bill and a rotary drawing-off member, of spindles carrying the said bill and said drawing-off member respectively, a helical pinion on each of the spindles, two quadrants each having helical teeth adapted to gear with and to transmit rotary motion to the spindles and means adapted to lock the said quadrants positively together during a portion of the motion of the bill-operating quadrant, the said positive locking device comprising a pin on the bill-quadrant co-operating with an opening in the drawing-off member quadrant, a pawl upon the bill-quadrant co-operating with a pin on the drawing-off member quadrant, and positive means for moving the said pawl into and out of engagement with the said pin.

In witness whereof we have signed this specification.

JOHN WILLIAM COOK.

Witness to the signature of the said John William Cook:
E. BATCHELDER.

THOMAS COLLINS.

Witness to the signature of the said Thomas Collins:
ERNALD S. MOSELEY.